(12) United States Patent
Diaz

(10) Patent No.: US 8,150,874 B2
(45) Date of Patent: Apr. 3, 2012

(54) SYSTEM FOR INTEGRATING CONTENT FROM EXTERNAL CORPORA INTO PRIMARY SEARCH ENGINE RESULTS

(75) Inventor: Fernando Diaz, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 332 days.

(21) Appl. No.: 12/628,036

(22) Filed: Nov. 30, 2009

(65) Prior Publication Data

US 2011/0131246 A1 Jun. 2, 2011

(51) Int. Cl.
*G06F 17/30* (2006.01)
*G06F 7/00* (2006.01)

(52) U.S. Cl. ....................................... 707/780

(58) Field of Classification Search .................. 707/780
See application file for complete search history.

(56) References Cited

U.S. PATENT DOCUMENTS

| | | | |
|---|---|---|---|
| 7,769,746 B2* | 8/2010 | Lu et al. | 707/713 |
| 2002/0062216 A1* | 5/2002 | Guenther et al. | 704/270.1 |
| 2004/0264780 A1* | 12/2004 | Zhang et al. | 382/224 |
| 2009/0281894 A1* | 11/2009 | Ratnaparkhi | 705/14.43 |

* cited by examiner

*Primary Examiner* — Kuen Lu
(74) *Attorney, Agent, or Firm* — Stattler-Suh PC

(57) ABSTRACT

A computer implemented method, computer-readable medium and system for deciding which external corpora, such as verticals, to integrate into primary Internet search engine results in response to a query is disclosed. Offline query-related data and user feedback data is incorporated. A probabilistic estimate is formed of the relevance of the verticals to the query.

18 Claims, 10 Drawing Sheets inauguration search
News Results for Inauguration
Online inauguration videos set records CNN - 3 hours ago
Castro watched inauguration, Argentine leader says CNN - 3 hours ago
Photographer: Inauguration like no moment I've ever witnessed CNN - 4 hours ago

} 205

Inauguration Day - Wikipedia
The swearing-in of the President of the United States occurs upon the commencement of
    a new term of a President of the United States. The United States Constitution mandates
that the President make the following oath or...
http://en.wikipedia.org/wiki/United_States_presidential_inauguration
Joint Congressional Committee on Inaugural Ceremonies
Charged with planning and conducting the inaugural activities at the Capitol: the
swearing-in ceremony and the luncheon honoring the President and Vice President.
http://inaugural.senate.gov
Inauguration Day 2009
Official site for the 2009 Inauguration of Barack Obama. Provides information about
events, tickets, and inaugural balls and parades.
http::inaugural.senate.gov/2009
Inaugural Addresses of the Presidents of the United States
From George Washington's first address in 1789 to the present. Includes a note on the
presidents who took the oath of office without a formal inauguration.
http://www.bartleby.com/124

SYSTEM FOR INTEGRATING CONTENT FROM EXTERNAL CORPORA INTO PRIMARY SEARCH ENGINE RESULTS

FIELD OF THE INVENTION

The present invention relates to the field of Internet searching. In particular, the present invention discloses a method and related system for deciding which external corpora to integrate into primary search engine results.

BACKGROUND

Traditional web search engines retrieve a ranked list of URL's in response to a query from a user. Increasingly, search results include content from specialized sub-collections or corpora known as "verticals", which may include non-text media collections such as images and videos, as well as genre-specific subsets of the web such as news and blogs. When a general web search engine has access to or maintains vertical search engines, one important task becomes the detection and presentation of relevant vertical results, known as "vertical selection". An objective is to maximize the user satisfaction by presenting the appropriate vertical display or displays: this includes the presentation of no display when the user is best satisfied by general web results.

One important aspect of the task of generating a single ranked list from multiple sub-collections ("distributed information retrieval") is deciding which sub-collections to search given a user's query. This may be approached using query classification techniques that automatically match queries to a predefined set of categories. This predefined set may be topical categories such as games, business, or health. However, this methodology is incomplete and does not take other factors into account.

SUMMARY

Disclosed is a computer-implemented method and system for deciding which external corpora, such as verticals, to integrate into primary Internet search engine results in response to a query. In some embodiments, the method includes:
   a. determining a first probabilistic estimate of the relevance of the external corpora (verticals) to the query from offline query-related data;
   b. combining the offline query-related data with user feedback data to determine a second probabilistic estimate of the relevance of the external corpora (verticals) to the query; and
   c. based on the second probabilistic estimate of relevance of the verticals to the query, determining which external corpora (vertical(s)) to integrate into the search engine results.

BRIEF DESCRIPTION OF THE DRAWINGS

FIG. 2 illustrates a diagram of exemplary search results, including web results and vertical results.

FIG. 10 illustrates a high-level block diagram of a computer system for implementing the

DETAILED DESCRIPTION

Figure 1:
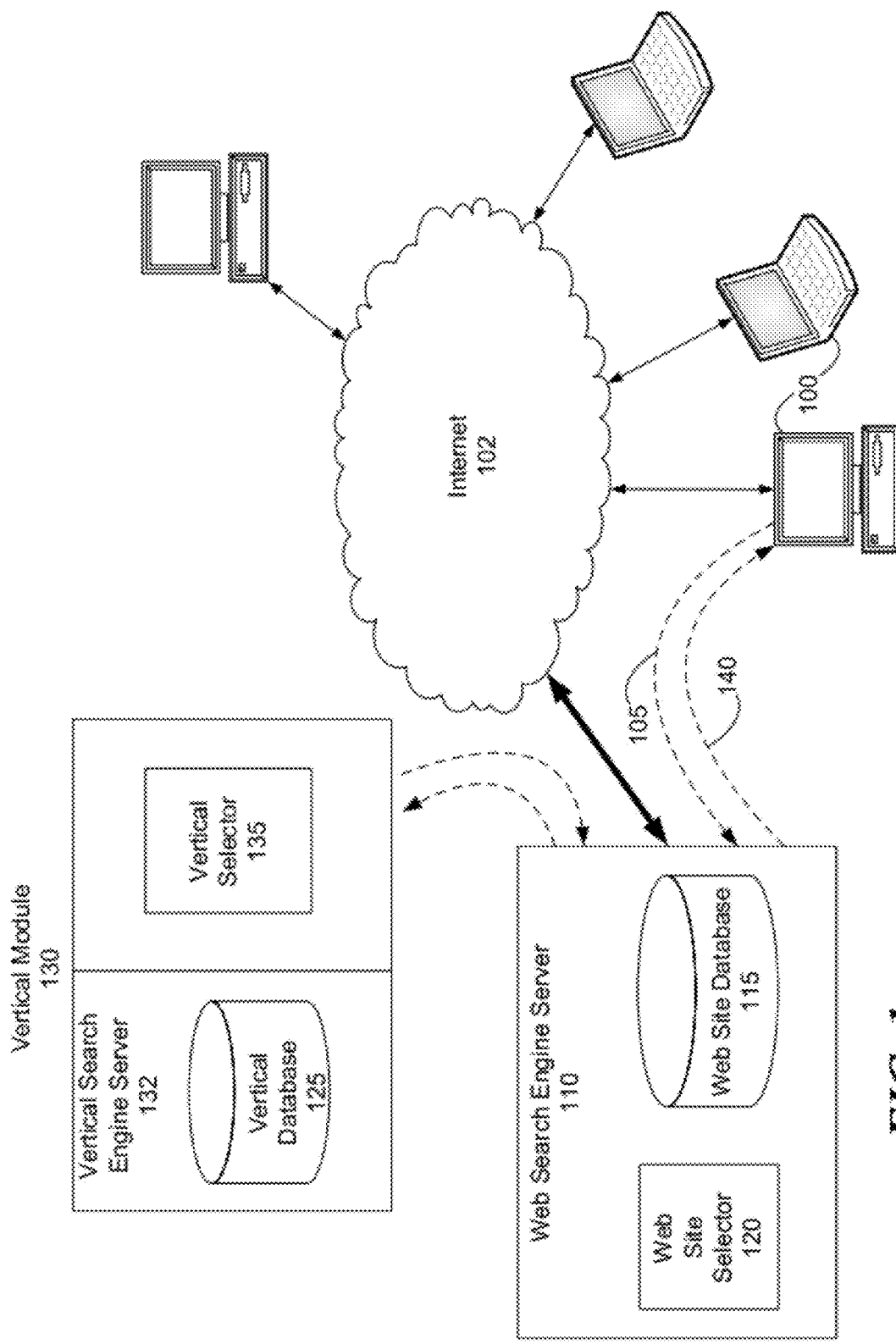
FIG. 1 illustrates a system that permits a user at a personal computer system to access an Internet search engine server on the Internet, submit a query, and obtain search results.

FIG. 1 illustrates a system that permits a user at a personal computer system to access an Internet search engine server on the Internet, submit a query, and obtain search results. In one embodiment, a user sends query 105 to web search engine server 110. Web search engine server 110 has access to web site database 115, web site selector 120, and vertical database 125. Vertical module 130, which may include one or more servers, such as a vertical search engine server 132, includes vertical database 125 and vertical selector 135. Vertical module interacts with Web site selector 120 to respond to query 105 with search results 140, which may include both Web sites and one or more vertical displays. The results 140 are sent to user(s) 100. In some embodiments, the methods and algorithms described herein are implemented by the vertical selector.

FIG. 2 illustrates a diagram of exemplary search results, including Web results 200 and vertical results 205. The search results page presents results from documents available on the World Wide Web. In addition to a Web index, the system also has access to "verticals." The result of issuing a query to verticals can be imbedded in the search results, where up to one vertical display 205 can be integrated above Web results 200.

Figure 3:
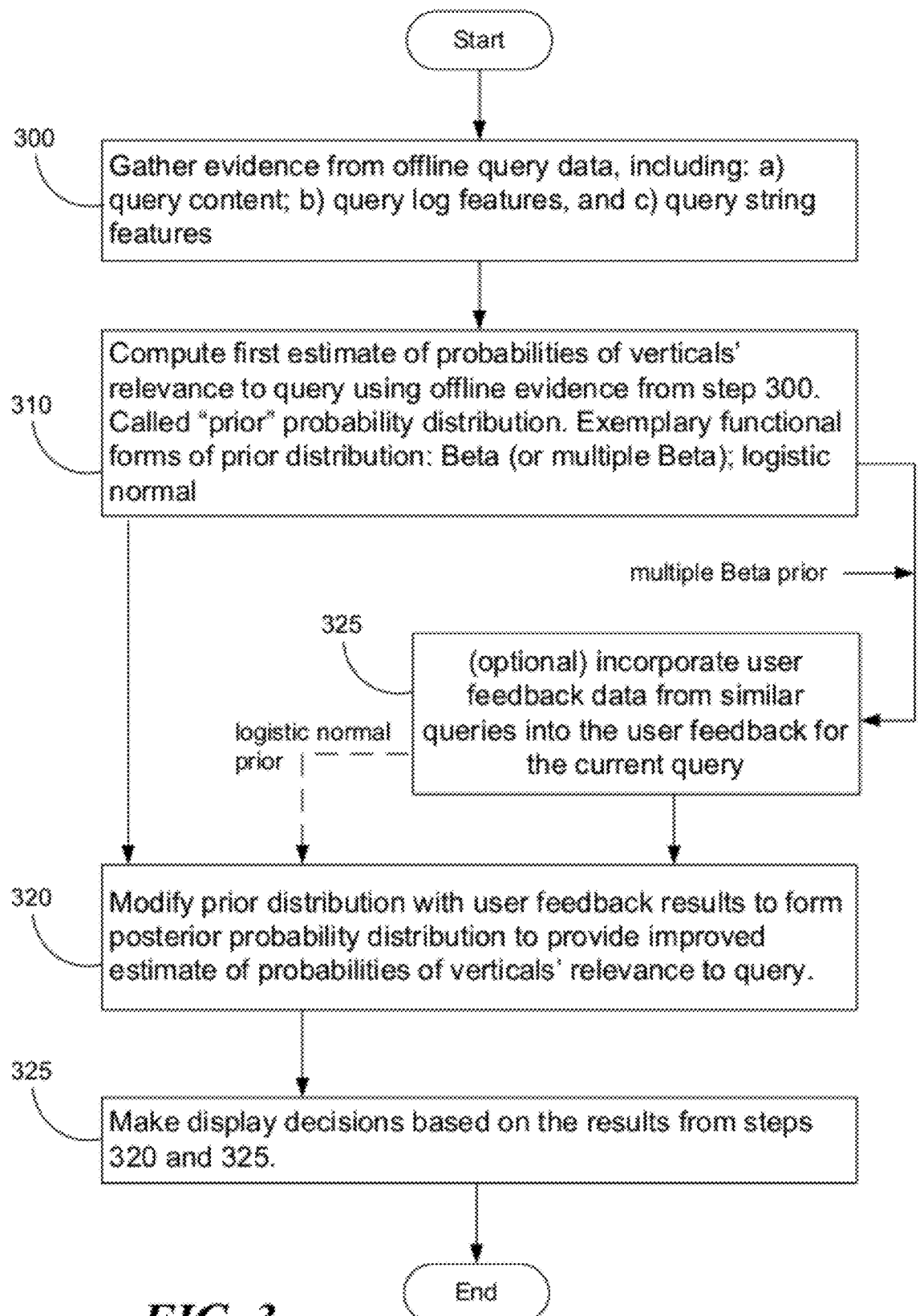
FIG. 3 illustrates a high level flow diagram of the external corpora (vertical) selection process using the query processing system in accordance with one embodiment.

FIG. 3 illustrates a high level flow diagram of the external corpora selection process. In one embodiment, the external corpora comprise verticals. Although the invention is described in conjunction with selecting verticals as external corpora, any type of external corpora may be used without deviating from he spirit of scope of the invention. In 300, evidence is derived from offline query data, which includes: a) query content, b) query log features, and c) query string features. Each of these features will be described in more detail hereinafter.

In 310, a first estimate of the probability of each vertical being relevant to the query is computed using the offline evidence from step 100. These estimates (which encompass k+1 situations for k possible verticals, one for each vertical, and one for no relevant verticals) are incorporated into a statistical quantity known as the "prior" probability distribution.

In step 320, if user feedback results for the vertical relevance to the query are available, those results are used to modify the prior distribution obtained from the offline results. This may be accomplished in different ways, depending on the functional form assumed for the prior distribution. Two prior distributions include: 1) Beta (or multiple Beta) prior distribution, and 2) logistic normal prior distribution. The prior distribution modified by the user feedback data is called the posterior probability distribution. This posterior distribution incorporates the offline evidence or data, and also incorporates the user feedback data. It provides an improved estimate of the probabilities of relevance of the possible verticals to the query.

In optional step 325, user feedback data from similar queries is incorporated into the user feedback for the current query. This step is positioned differently depending on the functional form of the prior distribution used. For a multiple Beta prior, similar query user feedback is incorporated just following step 310. For a logistic normal prior, similar query user feedback is incorporated into the current query user feedback during step 320.

In step 330, display decisions are made, based on the results from steps 320 and 325. Among the possible display decisions are: 1) pick one or no vertical with the highest probability of relevance, and 2) randomly choose a vertical, with probability of selection being set as proportional to the probability of relevance for each vertical.

Figure 4:
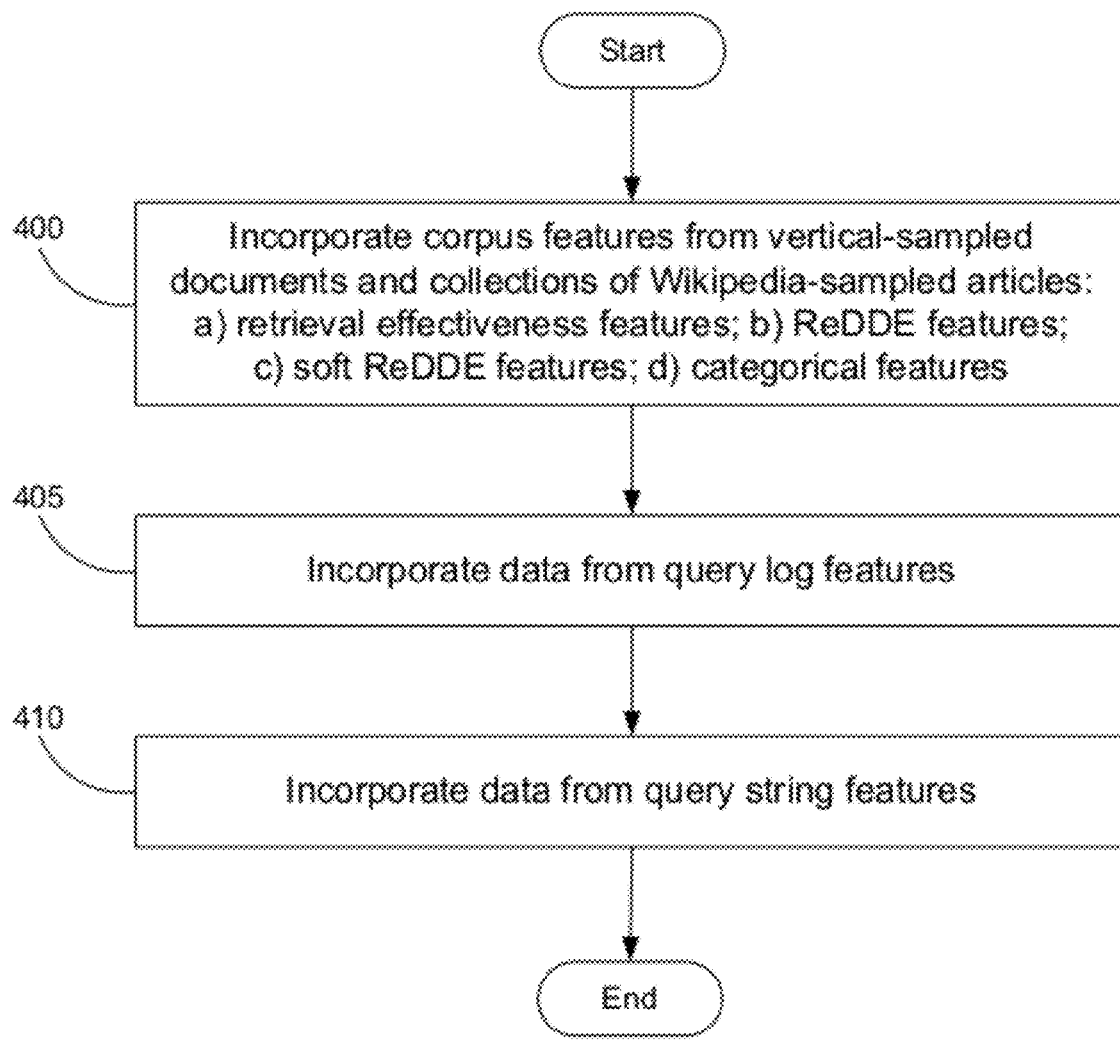
FIG. 4 illustrates a flow diagram of the gathering of offline data.

Step 300, the gathering of the offline data, is in itself a complex task. A more detailed flow description of step 300 is illustrated in FIG. 4. The data is gathered from: a) query and vertical content, also termed "corpus features" in generality; b) query log features; and c) query string features.

In step 400, for this embodiment, corpus features are incorporated from two distinct sets of corpora: collections of vertical-sampled documents, obtained using a variation of query-based sampling, and collections of Wikipedia-sampled articles, each mapped to a vertical heuristically using the Wikipedia article's categories. In one embodiment, four types of corpus features are used: retrieval effectiveness features; ReDDE features; soft ReDDE features; and categorical features. Retrieval effectiveness features may use Clarity, a cross-language information retrieval system, to quantify the predicted effectiveness of the query's retrieval on a vertical-representative corpus. ReDDE (Relevant Document Distribution Effectiveness, a resource-ranking algorithm that explicitly tries to estimate the distribution of relevant documents across the set of available databases) features are derived from a retrieval on an index that combines vertical-representative documents (either vertical- or Wikipedia-sampled). Soft ReDDE features generalize the ReDDE features. Instead of having documents map to a single vertical, a soft document-to-vertical membership has been derived using the similarity between the document and the vertical. Finally, categorical features are derived from the labels of automatically classified documents (e.g., sports, health, science). A query's membership to a class is proportional to the number of top-ranked documents assigned to the category. The data gathered from the corpus features, in other words, takes a query and correlates it with the verticals generated according to several query content and vertical content mappings. Note that although ReDDE and Clarity are two examples of corpus-based features, other corpus-based features may be used without deviating from the spirit or scope of the invention.

In step 405, data is gathered from query log features. The use of query log features is motivated by the assumption that a vertical's relevance may correlate with the likelihood of the vertical being issued by the query. In one embodiment, vertical-specific unigram language models were built using one year of queries issued directly by users to the vertical in question. Query log features used the query generation probability given by the vertical's query-log language model. Note that other non-language model query log features may be used, in isolation or in combination. The data gathered from the query log, in other words, takes a specific vertical and models which queries were directed to that vertical over the past year.

In step 410, data is gathered from query string features. The use of query string features derives from the query string itself, independent of external resources. For example, if the query contains the word "news", we may assume news vertical intent. The rule-based vertical trigger features, used in one embodiment, are based on 45 classes that characterize vertical intent, (e.g., weather, zip code, music artist, movie). Each trigger class is associated with manual classification rules using regular expressions and dictionary lookups. In addition, a rule-based geographic entity tagger is used to assign probabilities to the set of geographic entities appearing in the query, (e.g., city, country, landmark). Each of these geography types is considered a separate feature. Note that the query string features described herein are exemplary and other query string features may be used without deviating from he spirit or scope of the invention.

Figure 5:
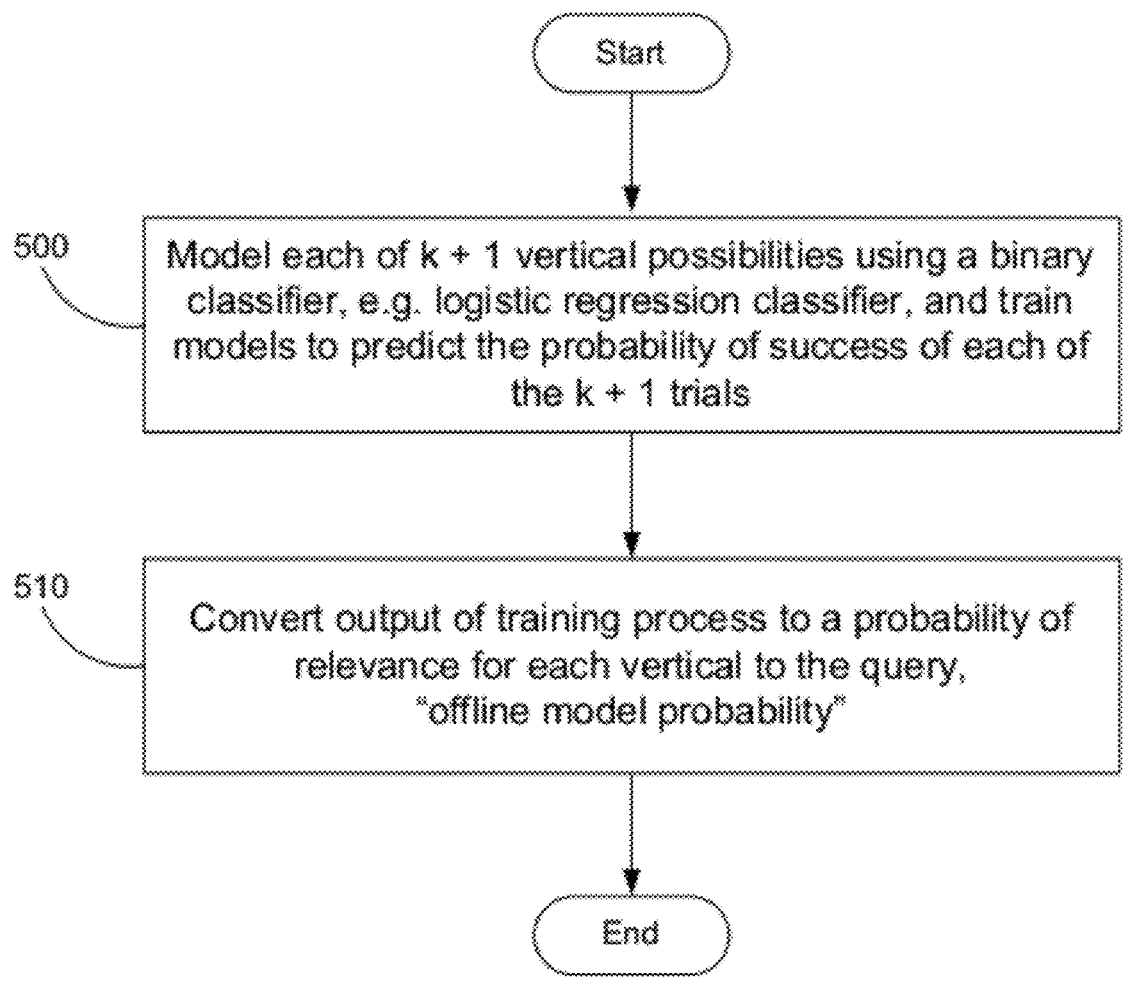
FIG. 5 illustrates a flow diagram of the formation of an offline probability estimate.

Referring back to FIG. 3, In step 310, a model is used in which the three classes of features described above, (i.e., data pertaining to query content features, query log features, and query string features), are incorporated to form an initial offline estimate of the probability of relevance of each possible vertical display to the query. A more detailed flow description of step 310 is illustrated in FIG. 5. Given a set of queries manually labeled with vertical intents, it is possible to train a statistical model to predict the relevant verticals for new queries, (i.e., to compute the probability that a vertical is relevant given a query). The correlation training process is based on a manually determined set of correlations for past queries. This set, however, is much smaller than the set expected to be seen in the production system. In one embodiment, in step 500, each of the k possible verticals, as well as the case where no verticals are relevant, is modeled, for example, using a logistic regression of a Bernoulli random variable (which takes on a value of either 0 or 1). Thus, in step 505, k+1 logistic regression models are trained, using the set of manually labeled queries as the training set, to predict the probability of success of each of the k+1 trials. It should be noted that, although a logistic regression classifier is used as an example, any binary classifier may be used. In step 510, the output of the training process is converted to a probability of relevance for each vertical to the query. This probability, termed the offline model probability, is called $\pi_q^v$ for query q and vertical v. $\pi_q^v$ is used as an input for following steps.

Referring now to FIG. 3, step 320 involves forming a prior probability distribution from the offline model probability obtained from the offline results of step 310, then adding the user input data to the prior probability distribution, to obtain a posterior distribution. The user feedback in this case is constrained to be binary, (i.e., positive feedback or click, negative feedback or skip). Two forms of prior distributions will be set forth in some detail; other forms may be used.

Figure 6:
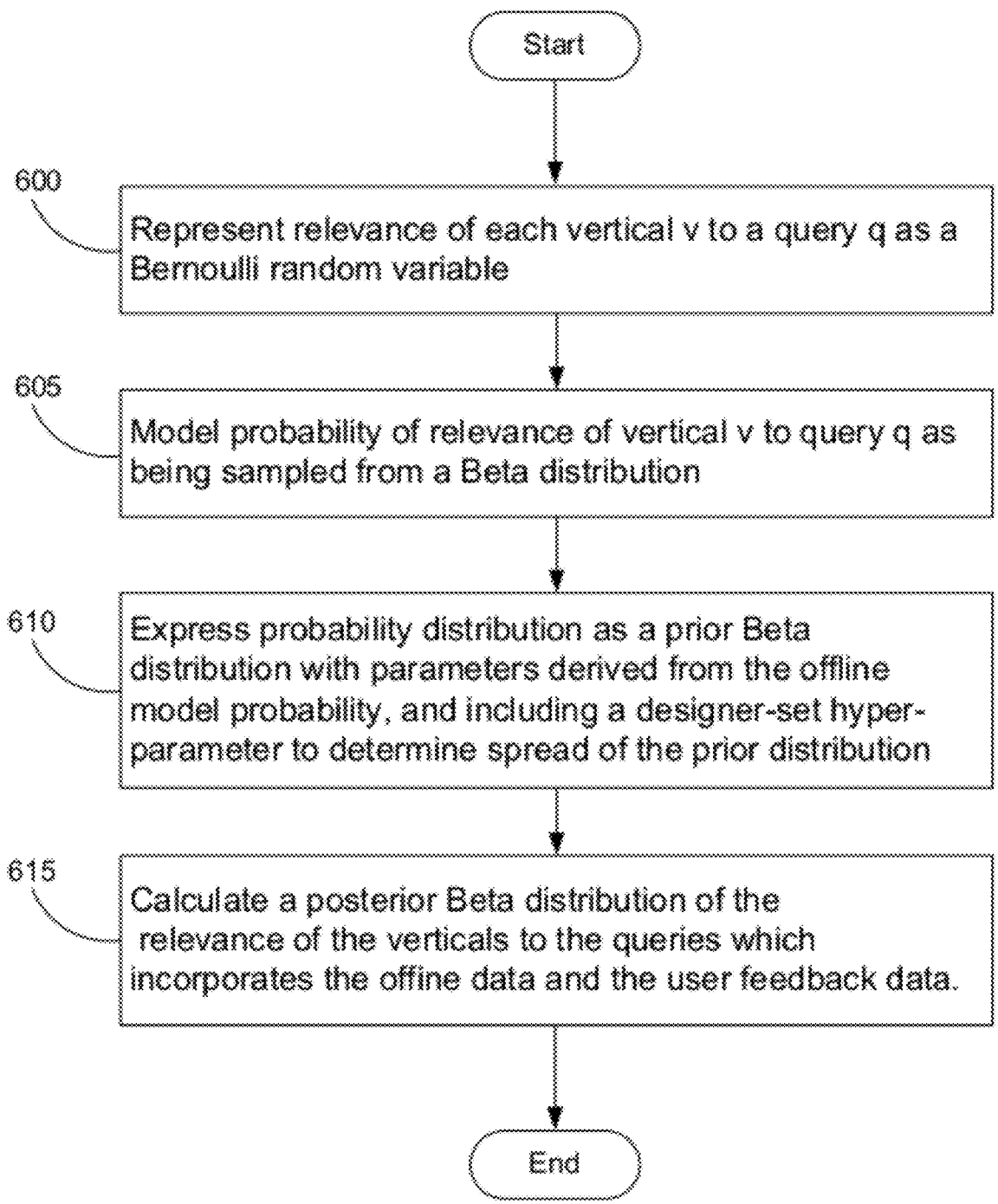
FIG. 6 illustrates a flow diagram of the formation of a multiple Beta type prior probability distribution.

The first exemplary form of prior distribution is a multiple beta prior. Beta distributions are generally described in Wikipedia at http://en.wikipedia.org/wiki/Beta_distribution. FIG. 6 illustrates the process flow using the multiple beta prior. In step 600, the relevance of each vertical v to a query q is represented as a Bernoulli random variable, (i.e., with value 0 or 1). In step 605, the probability of relevance of vertical v to query q, $p_q^v$, is modeled as being sampled from a Beta distribution. In step 610, the probability distribution of $p_q^v$ is therefore expressed as prior distribution $$p_q^v \sim \text{Beta}(a_q^v, b_q^v) \quad (1)$$

with the a and b parameters, which control the shape of the prior distribution, being derived from the offline model probability $\pi_q^v$ as follows:

$$a_q^v = \mu \pi_q^v, b_q^v = \mu(1-\pi_q^v) \quad (2)$$

The inputs for the prior distribution, therefore, are $\pi_q^v$ (the offline probability model), and $\mu$, which is a hyper-parameter set by the system designer, which may be any positive number. A large value of $\mu$ will concentrate the distribution around $\pi_q^v$, whereas a small value of $\mu$ will spread out the distribution.

In step 615, using the prior distribution of equations (1) and (2), and assuming that positive and negative feedback information input is available for the query-vertical pairs, ($R_q^v$ is defined as the number of clicks 7 (e.g., positive feedback), and $\overline{R}_q^v$ is defined as the number of skips, (e.g., negative feedback) a posterior distribution of the relevance of the verticals to the queries is calculated which incorporates the offline data and the user feedback data. This posterior distribution is also a Beta distribution; its mean can be calculated to be $$\tilde{p}_q^v = \frac{R_q^v + \mu \pi_q^v}{V_q^v + \mu} \quad 3)$$

where $V_q^v = R_q^v + \overline{R}_q^v$ represents the number of times vertical display v was presented for query q. The form of this equation provides additional interpretation of the designer-set hyper-parameter $\mu$: for small values of $\mu$ the user feedback plays a more significant role, whereas for large values of $\mu$ the offline data plays a more significant role.

Figure 7:
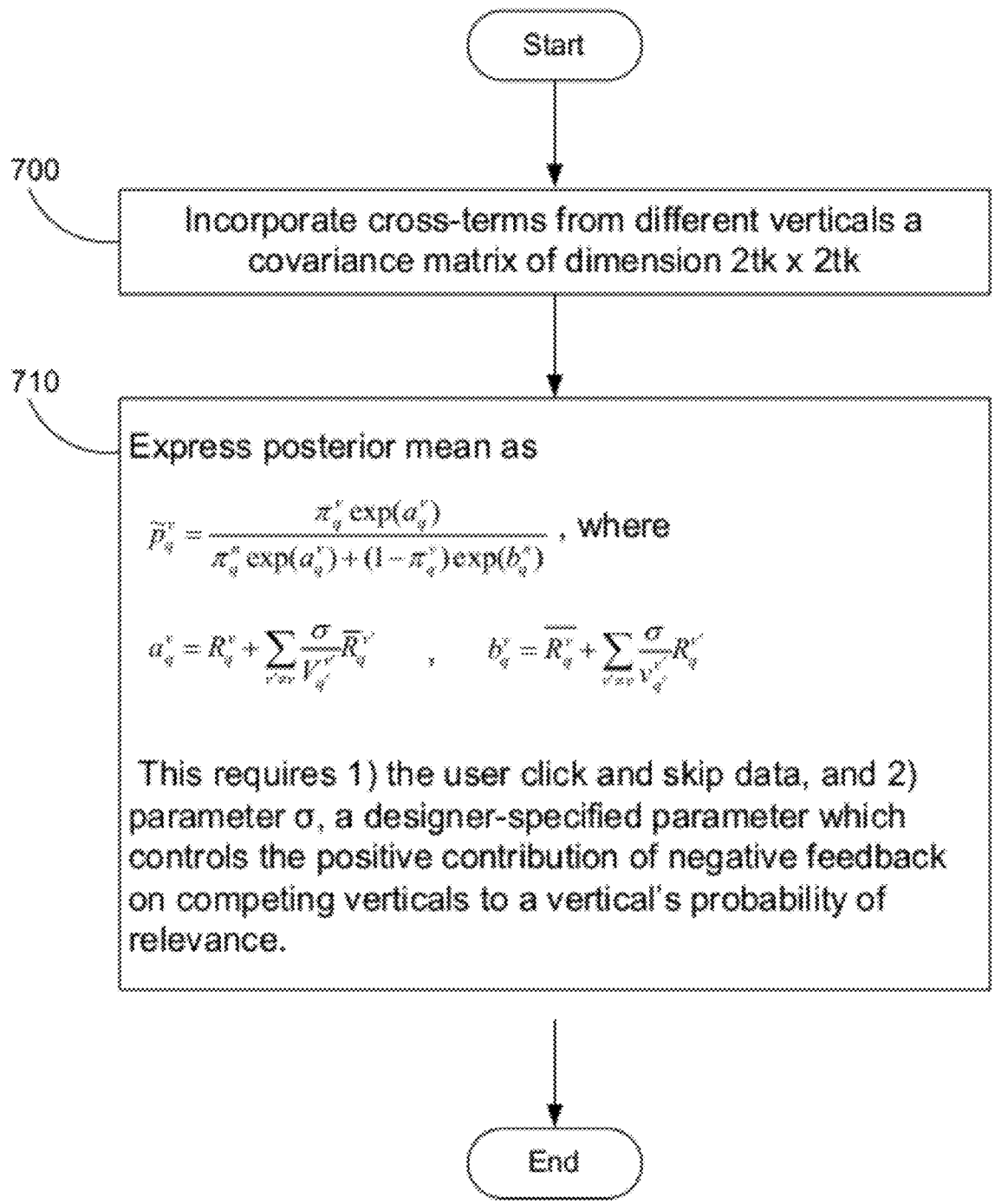
FIG. 7 illustrates a flow diagram of the formation of a logistic normal type prior probability distribution.

The second exemplary form of prior distribution is the logistic normal prior. Logistic normal distributions are described in J. Aitchison and S. M. Shen, *Logistic-normal distributions: Some properties and uses*, Biometrika, 67(2): 261272, August 1980. The flow of this method is illustrated in FIG. 7. In step 700, this method incorporates cross-terms from different verticals, in the form of a covariance matrix $\Sigma$ of dimension 2tk×2tk. k is the number of possible vertical choices, and t−1 is the number of queries that have been issued to the system. In step 705, a prior distribution is derived of the form $$p_q^v = \frac{\exp(W_{tv})}{\exp(W_{tv}) + \exp(\overline{W}_{tv})} \quad 4)$$

where: W and $\overline{W}$ are two tx×k random matrices, with their elements sampled from a single multivariate normal, i.e., W, $\overline{W} \sim N(\eta, \Sigma)$; $\eta$ is a 2tk×1 vector of means.

In step 710, as can be derived using this type of prior distribution, the posterior mean is expressed as:

$$\tilde{p}_q^v = \frac{\pi_q^v \exp(a_q^v)}{\pi_q^v \exp(a_q^v) + (1 - \pi_q^v) \exp(b_q^v)}, \text{ where} \quad 5)$$

$$a_q^v = R_q^v + \sum_{v' \neq v} \frac{\sigma}{V_{q'}^{v'}} \overline{R}_{q'}^{v'}, \quad b_q^v = \overline{R}_q^v + \sum_{v' \neq v} \frac{\sigma}{V_{q'}^{v'}} R_{q'}^{v'} \quad 6)$$

$R_q^v$ and $\overline{R}_q^v$ are Boolean variables indicating whether a vertical v received positive or negative feedback from query q. Note that the required inputs to yield the posterior mean output are: 1) the user click and skip data, and 2) parameter $\sigma$, a designer-specified parameter which controls the positive contribution of negative feedback on competing verticals to a vertical's probability of relevance. $\sigma$ can take any positive value. A large value of $\sigma$ would indicate only one relevant vertical, whereas a small value of $\sigma$ would indicate multiple relevant verticals.

It has been found that the logistic normal prior method is best suited to cases where there is a clear preferred vertical, whereas the multiple beta method is more effective in cases of similar rated, or ambiguous, verticals.

Figure 8:
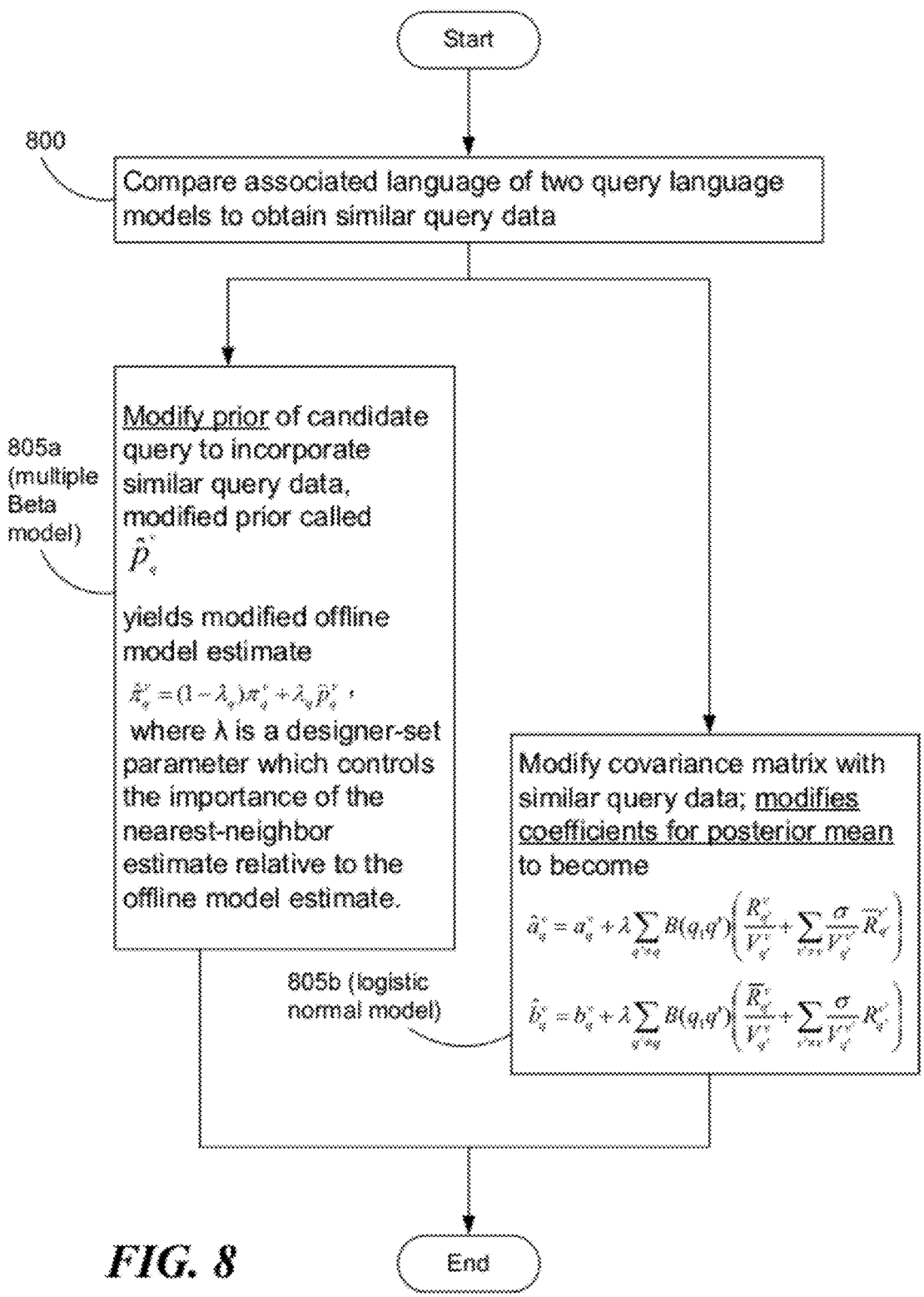
FIG. 8 illustrates a flow diagram of the incorporation of similar query feedback.

Referring now to FIG. 3, in optional step 325, user feedback data from similar queries is incorporated into the user feedback for the current query. This step is positioned differently depending on the functional form of the prior distribution used. For a multiple Beta prior, similar query user feedback is incorporated just following step 310. For a logistic normal prior, similar query user feedback is incorporated into the current query user feedback during step 320. A flow diagram of incorporation of similar query feedback is illustrated in FIG. 8.

A corpus-based similarity measure using language models of retrieved results is used to detect similarity between queries. In an embodiment, in step 800, given two query language models, they are compared by comparing their associated language using the Bhattacharyya correlation. This is described in Wikipedia at the World Wide Web address of http://en.wikipedia.org/wiki/Bhattacharyya_distance. The Bhattacharyya correlation ranges between 0 and 1 and is defined as $$B(q_i, q_j) = \sum_{w \in v} \sqrt{P(w|\theta_{q_i}) P(w|\theta_{q_j})} \quad 7)$$

where $P(w|\theta_{qi})$ is the probability of w given document $q_i$.

The information from similar queries is incorporated as follows for the two types of priors discussed. First, in step 805a, for the multiple beta model, the prior of the candidate query is modified to become $\hat{p}_q^v$ known as the nearest neighbor estimate of $p_q^v$, given by:

$$\hat{p}_q^v = \frac{1}{Z_q} \sum_{q'} B(q, q') \tilde{p}_{q'}^v, \quad 8)$$

where $Z_q$ is a normalization factor equal to $\Sigma_{q'} B(q, q')$. In step 810a, the offline model estimate $\pi_q^v$ is then modified and computed to equal $$\hat{\pi}_q^v = (1 - \lambda_q) \pi_q^v + \lambda_q \hat{p}_q^v, \quad 9)$$

where $\lambda$ is a designer-set parameter that can range from 0 to 1, which controls the importance of the nearest-neighbor estimate relative to the offline model estimate. $\lambda_q$ equals $\lambda$ multiplied by the maximum similarity value of the set of q's.

Second, in step 805b, for the logistic normal prior model, similar query data is incorporated by adding elements to covariance matrix $\Sigma$. Using this method, it can be derived that the similar query data modifies the exponents $a_q^v$ and $b_q^v$ in equation (6) to become $$\hat{a}_q^v = a_q^v + \lambda \sum_{q' \neq q} B(q_1 q') \left( \frac{R_{q'}^v}{V_{q'}^v} + \sum_{v' \neq v} \frac{\sigma}{V_{q'}^{v'}} \overline{R}_{q'}^{v'} \right) \quad 10)$$

-continued $$\hat{b}_q^v = b_q^v + \lambda \sum_{q' \neq q} B(q_1 q') \left( \frac{R_{q'}^v}{V_{q'}^v} + \sum_{v' \neq v} \frac{\sigma}{V_{q'}^{v'}} R_{q'}^{v'} \right)$$

Thus, the similar query feedback data modifies the current query user feedback equations. Note that use of the Bhattacharyya similarity measure is exemplary: other types of similarity measures, such as cosine similarity, may be used without deviating from the spirit or scope of the invention.

Referring to FIG. 3, in step 330, display decisions are made, based on the results from steps 320 and 325. Among the possible display decisions are: 1) pick one or no vertical with the highest probability of relevance, as predicted from the posterior distribution which may have additional factors such as similar query data included and 2) randomly choose a vertical, with probability of selection being set as proportional to the probability of relevance for each vertical.

The addition of a random aspect (known as the ϵ-greedy method) presents random displays for queries with some probability ϵ. Another randomization method, referred to herein the Boltzmann method, exploits the posterior means across verticals. This method can be broadly described as follows: randomly choose a vertical with a probability proportional to the probability of relevance of that vertical. A visual representation of the randomness injected into the selection would be throwing darts at a board with regions corresponding to the various verticals, but the area of each region would be proportional to the corresponding vertical's probability of relevance. Thus verticals with a higher likelihood of relevance would be included in the random component more often than verticals with lower likelihood of relevance.

Specifically, using the Boltzmann method, in order to incorporate a random element, the decision about which vertical to present is sampled from a multinomial over verticals, this multinomial being derived from the estimated vertical relevance probabilities $\tilde{p}_q^v$. An exemplary form of the multinomial is a Boltzmann distribution of the form $$P(v)=1/Z \exp(\tilde{p}_q^v/\tau),$$

where $Z=\Sigma_v \exp(\tilde{p}_q^v/\tau)$, and $\tau$, a positive quantity, is a designer-set parameter which controls the uniformity of the random vertical selection. As $\tau$ approaches $\infty$, the vertical selection becomes more random, and as $\tau$ approaches zero, it becomes less random.

Evaluation

An important aspect of the decisions is the evaluation of the effectiveness of the decisions. Table 1 summarizes the results for the best performing runs of the algorithms described herein, for all queries.

TABLE 1

| | δ = 0.95 | δ = 0.90 | δ = 0.75 |
|---|---|---|---|
| π | 0.618 ± 0.001 | 0.618 ± 0.001 | 0.618 ± 0.001 |
| $MB^U$ | 0.745 ± 0.001 | 0.732 ± 0.001 | 0.669 ± 0.001 |
| $MB^\pi$ | 0.878 ± 0.002 | 0.836 ± 0.001 | 0.733 ± 0.001 |
| $MB_S^\pi$ | 0.885 ± 0.002 | 0.843 ± 0.002 | 0.730 ± 0.003 |
| $\epsilon - MB^\pi$ | 0.870 ± 0.001 | 0.835 ± 0.002 | 0.752 ± 0.001 |
| $B - MB^\pi$ | 0.896 ± 0.001 | 0.881 ± 0.001 | 0.816 ± 0.001 |
| $LN^U$ | 0.722 ± 0.001 | 0.709 ± 0.001 | 0.650 ± 0.001 |
| $LN^\pi$ | 0.891 ± 0.002 | 0.883 ± 0.001 | 0.851 ± 0.001 |
| $LN_S^\pi$ | 0.894 ± 0.001 | 0.887 ± 0.002 | 0.853 ± 0.002 |
| $\epsilon - LN^\pi$ | 0.891 ± 0.001 | 0.883 ± 0.001 | 0.851 ± 0.001 |
| $B - LN^\pi$ | 0.887 ± 0.001 | 0.880 ± 0.001 | 0.847 ± 0.001 |

Table 1 lists a quantity called the normalized $U_{macro}$, the normalized macro-averaged utility, for the various algorithms. The average utility for an individual query is computed by summing the comparison between the user intent and the prediction, over the set of times the query was issued. This individual query average utility is then summed and averaged over the set of queries to obtain the macro-averaged utility. A normalization factor equal to the best expected value for macro-averaged utility is incorporated to obtain the normalized $U_{macro}$. The upper bound on normalized $U_{macro}$ is 1, (i.e., a perfect system has a performance equal to 1). A designer-set parameter, δ, which ranges between 0 and 1, is defined as the probability of correctly detecting user feedback, (i.e., it introduces noise into the feedback). The higher the value of δ, the more accurate and less noisy is the feedback. Note that preferred adaptation algorithms are robust to noisy feedback.

Row 1 in Table 1 represents the offline estimate, without user feedback. Row 2 is the Multiple Beta model with a uniform prior (i.e., this is a feedback-only model); Row 3 is Multiple Beta with the offline π prior; row 4 incorporates similar query intent; Row 5 adds ϵ-greedy randomization; Row 6 utilizes the Boltzmann form for the randomization. Rows 6-10 follow the same pattern, but using the Logistic Normal prior model.

The results summarized in Table 1 demonstrate that, although feedback-only models can outperform offline-only models, combining the two results in significant improvements. It is seen that using a logistic normal prior outperforms multiple beta priors across all queries. However, it can also be seen that multiple beta priors with randomized decision making provides stable performance for both single and multiple intent queries, i.e., queries for which multiple verticals are relevant. Multiple Beta priors outperform logistic normal priors for multiple intent queries.

System Considerations

Figure 9:
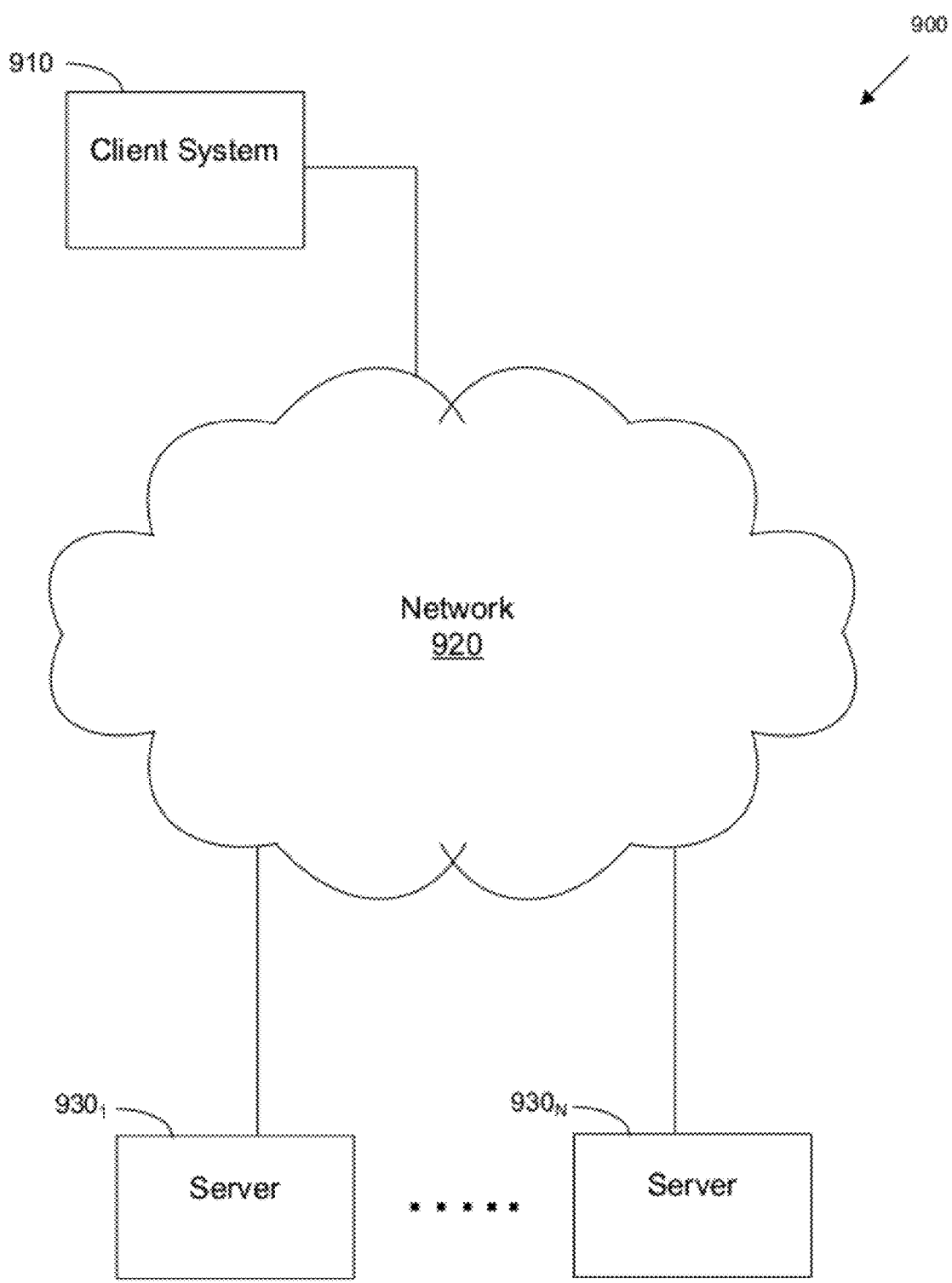
FIG. 9 illustrates one embodiment of a network environment for operation of the query processing system of the present invention.

FIG. 9 illustrates one embodiment of a network environment 900 for operation of the query processing system of the present invention. The network environment 900 includes a client system 910 coupled to a network 920 (such as the Internet, an intranet, an extranet, a virtual private network, a non-TCP/IP based network, any LAN or WAN, or the like) and server systems $930_1$ to $930_N$. The client system 910 is configured to communicate with any of server systems $930_1$ to $930_N$, for example, to request and receive base content and additional content (e.g., in the form of a web page).

A server system, as defined herein, may include a single server computer or a plurality of server computers. The servers may be located at a single facility or the servers may be located at multiple facilities. In some embodiments, the vertical module may comprise a plurality of servers, such as server systems $930_1$ to $930_N$. The vertical selector may comprise one or more additional servers, coupled to and accessible by the server systems for the vertical module, such as server systems $930_1$ to $930_N$. In addition, the third parties to the query processing system, such as integrator networks, third party agents and third party recipients, comprises one ore more severs, such as servers $930_1$ to $930_N$. As such, servers $930_1$ to $930_N$ are intended to represent a broad class of server farm architectures and the servers $930_1$ to $930_N$ may be configured in any manner without deviating from the spirit or scope of the invention.

The client system 910 may include a desktop personal computer, workstation, laptop, PDA, cell phone, any wireless application protocol (WAP) enabled device, or any other device capable of communicating directly or indirectly to a network. The client system 910 typically runs a web-browsing program that allows a user of the client system 910 to request and receive content from server systems 930₁ to 930$_N$ over network 920. The client system 910 typically includes one or more user interface devices 940 (such as a keyboard, a mouse, a roller ball, a touch screen, a pen or the like) for interacting with a graphical user interface (GUI) of the web browser on a display (e.g., monitor screen, LCD display, etc.).

In some embodiments, the client system 910 and/or system servers 930₁ to 930$_N$ are configured to perform the methods described herein. The methods of some embodiments may be implemented in software or hardware configured to optimize the selection of additional content to be displayed to a user.

Figure 10:
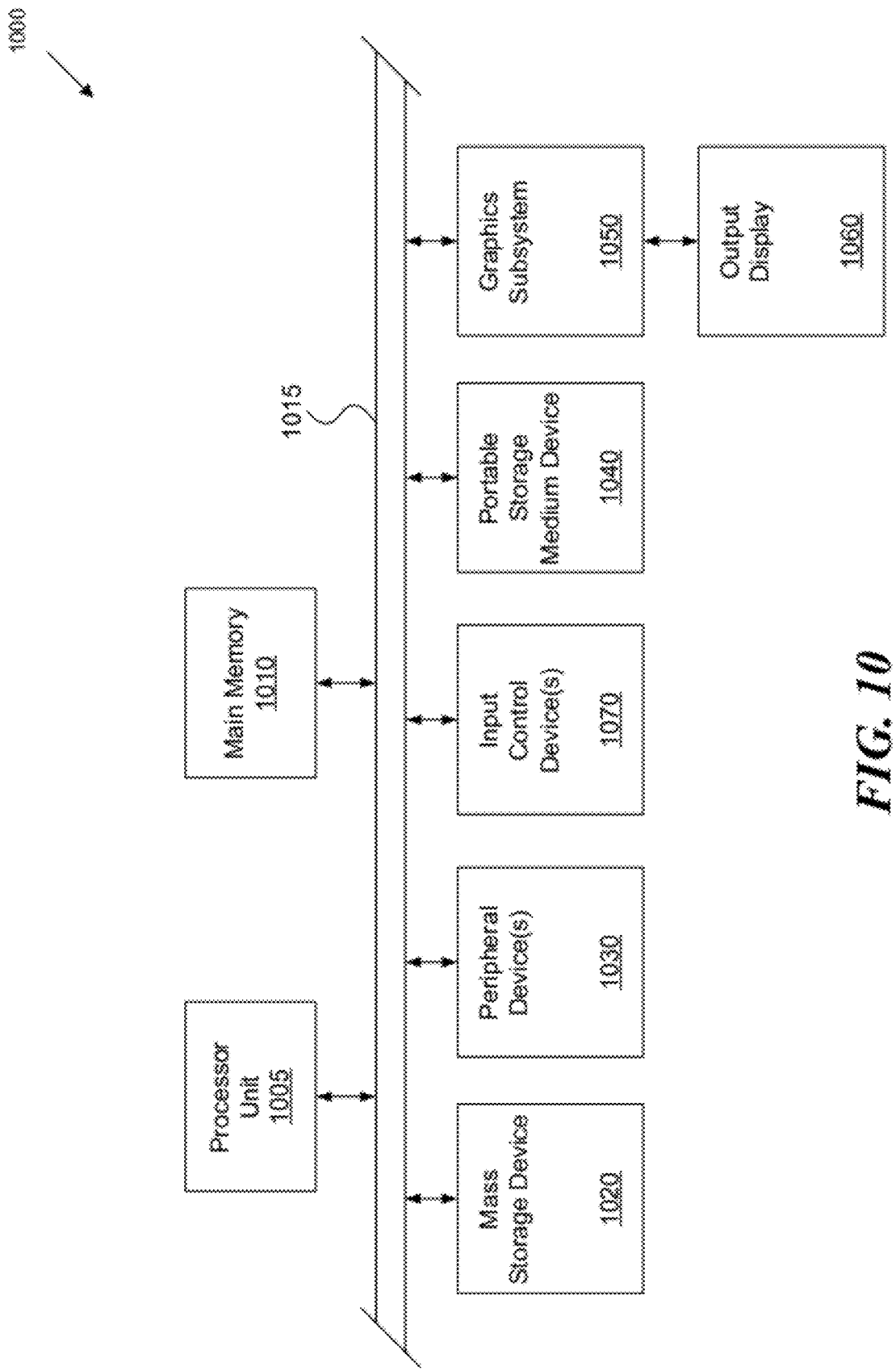

FIG. 10 illustrates a high-level block diagram of a general-purpose computer system. The general-purpose computer system may be a user computer or a server computer. A computer system 1000 contains a processor unit 1005, main memory 1010, and an interconnect bus 1015. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the query processing system of the present invention is partially implemented in software, the main memory 1010 stores the executable code when in operation. The main memory 1010 may include banks of dynamic random access memory (DRAM) as well as high-speed cache memory.

The computer system 1000 may further include a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 10 as being connected via the bus 1015. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the query processing system software for loading to the main memory 1010.

The portable storage medium drive 1040 may operate in conjunction with a portable non-volatile storage medium, such as a compact disc read only memory (CD-ROM), to input and output data and code to and from the computer system 1000. In one embodiment, the query processing system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 may contain the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

In some embodiments, the query processing system is software that includes a plurality of computer executable instructions for implementation on a general-purpose computer system. Prior to loading into a general-purpose purpose computer system, the query processing system software may reside as encoded information on a computer readable medium, such as a hard disk drive, non-volatile memory (e.g., flash), compact disc read only memory (CD-ROM) or DVD.

Some embodiments may include a computer program product which is a storage medium (media) having instructions stored thereon/in that may be used to control, or cause, a computer to perform any of the processes of the invention. The storage medium may include, without limitation, any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), some implementations include software for controlling both the hardware of the general purpose/specialized computer or microprocessor, and for enabling the computer or microprocessor to interact with a human user or other mechanism utilizing the results of the invention. Such software may include without limitation device drivers, operating systems, and user applications. Ultimately, such computer readable media further includes software for performing aspects of the invention, as described above.

Included in the programming (software) of the general/specialized computer or microprocessor are software modules for implementing the teachings of the invention, including without limitation encoding an archive from a library to generate an encoded archive that is compatible with a virtual library device, and uploading the encoded archive, according to the processes described above.

In one hardware implementation, the query processing system may comprise a dedicated processor including processor instructions for performing the functions described herein. Circuits may also be developed to perform the functions described herein.

It is not expected that the invention should be limited to the exact embodiments described herein. It should be apparent to those skilled in the art that changes and modifications can be made without departing from the inventive concept. By way of example, other types of query string, log, corpus, and feedback features can be combined. These include classifiers using user feedback information as features directly combined with non-feedback features.

The techniques described herein have application for use in cases where the vertical is owned by the search engine, (e.g., the corpora are properties of the general search engine). It may also be used when the corpora are not owned by the search engine, (e.g., a digital library interface which only provides a limited interface to the general search engine). Furthermore, it can also be used for non-vertical content such as "calculators" or other automatic processes which impact web search results. The scope of the invention should be construed in view of the claims.

What is claimed is:

1. A computer implemented method for selecting external corpora to integrate into primary internet search engine results in response to a query, comprising:
   receiving a query, at least one server computer, from a client computer over a network;
   storing an offline model probability in memory;
   processing said query by:
      computing a first probabilistic estimate of relevance of external corpora to said query from offline query-related data from said offline model probability;
      combining said offline query-related data with user feedback data to determine a second probabilistic estimate of relevance of said external corpora to said query;
      selecting said external corpora to integrate into a response to said query based on said second probabilistic estimate of relevance of said external corpora to said query; and
   transmitting over said network, for display on said client computer search results for said query that include said external corpora selected.

2. The method of claim 1, wherein said external corpora comprise verticals.

3. The method of claim 1, further comprises computing said offline model by:
   a) gathering data from query and corpus features;
   b) gathering data from query log features;
   c) gathering data from query string features; and
   d) from elements a-c, forming an initial offline estimate of the probability of relevance of each said external corpora to said first query.

4. The method of claim 1, wherein combining said offline query-related data with user feedback data to determine a second probabilistic estimate of relevance of said external corpora to said query comprises:
   a) forming a prior probability distribution from the offline model probability;
   b) adding the user feedback data to the prior probability distribution, and;
   c) from elements a) and b), obtaining a posterior probability distribution, said posterior probability distribution being a second probabilistic estimate of relevance of said external corpora to said first query.

5. The method of claim 4, wherein said prior probability distribution comprises a multiple Beta distribution or a logistic normal distribution.

6. The method of claim 1, further comprising including data from similar queries to said query.

7. The method of claim 1, wherein selecting said external corpora to integrate into a response to said query comprises adding a random component.

8. The method of claim 7, wherein adding a random component comprises using one of: $\epsilon$-greedy method, and Boltzmann method.

9. A query processing system comprising:
   storage for storing an offline model probability in memory;
   at least one server computer, comprising processor and memory, coupled to said storage, for receiving a query from a client computer over a network and for processing said query by:
      computing a first probabilistic estimate of relevance of external corpora to said query from offline query-related data from said offline model probability;
      combining said offline query-related data with user feedback data to determine a second probabilistic estimate of relevance of said external corpora to said query;
      selecting said external corpora to integrate into a response to said query based on said second probabilistic estimate of relevance of said external corpora to said query; and
   said server computer for transmitting over said network, for display on said client computer, search results for said query that include said external corpora selected.

10. The query processing system of claim 9, wherein said external corpora comprise verticals.

11. A computer-readable medium that stores a set of computer instructions for selecting external corpora to integrate into primary internet search engine results in response to a query, said instructions for:
   receiving a query, at least one server computer, from a client computer over a network;
   storing an offline model probability in memory;
   processing said query by:
      computing a first probabilistic estimate of relevance of external corpora to said query from offline query-related data from said offline model probability;
      combining said offline query-related data with user feedback data to determine a second probabilistic estimate of relevance of said external corpora to said query;
      selecting said external corpora to integrate into a response to said query based on said second probabilistic estimate of relevance of said external corpora to said query; and
   transmitting over said network, for display on said client computer search results for said query that include said external corpora selected.

12. The computer-readable medium of claim 11, wherein said external corpora comprise verticals.

13. The computer-readable medium of claim 11, further comprising computing said offline model by:
   e) gathering data from query and corpus features;
   f) gathering data from query log features;
   g) gathering data from query string features; and
   h) from elements a-c, forming an initial offline estimate of the probability of relevance of each said external corpora to said first query.

14. The computer-readable medium of claim 11, wherein combining said offline query-related data with user feedback data to determine a second probabilistic estimate of relevance of said external corpora to said query comprises:
   a) forming a prior probability distribution from the offline model probability;
   b) adding the user feedback data to the prior probability distribution, and;
   c) from elements a) and b), obtaining a posterior probability distribution, said posterior probability distribution being a second probabilistic estimate of relevance of said external corpora to said first query.

15. The computer-readable medium of claim 14, wherein said prior probability distribution comprises a multiple Beta distribution or a logistic normal distribution.

16. The computer-readable medium of claim 11, further comprising including data from similar queries to said query.

17. The computer-readable medium of claim 11, wherein selecting said external corpora to integrate into a response to said query comprises adding a random component.

18. The computer-readable medium of claim 17, wherein adding a random component comprises using one of: $\epsilon$-greedy method, and Boltzmann method.

* * * * *